(12) United States Patent
Leon et al.

(10) Patent No.: US 10,563,789 B2
(45) Date of Patent: Feb. 18, 2020

(54) ACTUATOR WITH TORSIONAL SPRING ASSEMBLY

(71) Applicant: GE Oil & Gas Pressure Control LP, Houston, TX (US)

(72) Inventors: Claudia Isabella Leon, Houston, TX (US); Keith M. Adams, Houston, TX (US); Travis Kyle McEvoy, Houston, TX (US)

(73) Assignee: GE Oil & Gas Pressure Control LP, Houston, TX (US)

( * ) Notice: Subject to any disclaimer, the term of this patent is extended or adjusted under 35 U.S.C. 154(b) by 78 days.

(21) Appl. No.: 15/097,826

(22) Filed: Apr. 13, 2016

(65) Prior Publication Data

US 2017/0299082 A1   Oct. 19, 2017

(51) Int. Cl.
*F16K 31/122* (2006.01)
*E21B 34/02* (2006.01)
*F16K 3/02* (2006.01)

(52) U.S. Cl.
CPC .......... *F16K 31/1221* (2013.01); *E21B 34/02* (2013.01); *F16K 3/0254* (2013.01)

(58) Field of Classification Search
CPC ...... F16K 3/02; F16K 31/1221; F16K 3/0254; F16K 31/124; E21B 34/02; F16H 19/04
USPC .......................................... 251/62, 250, 291
See application file for complete search history.

(56) References Cited

U.S. PATENT DOCUMENTS

| | | | |
|---|---|---|---|
| 3,605,796 A * | 9/1971 | Sette .......................... | F16K 3/02 137/385 |
| 4,072,167 A | 2/1978 | Habiger | |
| 4,090,589 A | 5/1978 | Fitzwater | |
| 4,869,459 A * | 9/1989 | Bourne ............... | F16K 31/1221 251/58 |
| 8,002,236 B2 * | 8/2011 | Myers ..................... | F16K 35/16 251/110 |
| 2007/0102660 A1 * | 5/2007 | Kouzu ...................... | F02D 9/12 251/250 |
| 2014/0097363 A1 * | 4/2014 | Young ................. | F16K 31/1221 251/58 |

* cited by examiner

*Primary Examiner* — Craig J Price
*Assistant Examiner* — Andrew J Rost
(74) *Attorney, Agent, or Firm* — Hogan Lovells US LLP (57) ABSTRACT

An apparatus for actuating a valve includes an actuator body with a central body axis and a proximal end and a distal end, the proximal end having a connector selectively connectable to a valve assembly. An actuator stem extends along the central body axis. A torsional spring assembly has at least one torsional spring with a spring axis that is offset at an angle from the central body axis. A motion translator engages an inner end of the torsional spring assembly and the actuator stem, selectively converting rotation of the at least one torsional spring about the spring axis of the at least one torsional spring to linear movement of the actuator stem along the central body axis.

20 Claims, 5 Drawing Sheets

ACTUATOR WITH TORSIONAL SPRING ASSEMBLY

BACKGROUND

1. Field of Disclosure

This disclosure relates in general to valve actuators, and in particular to non-linear return spring assemblies for an actuator.

2. Description of Related Art

Valves can sometimes have a linearly translating member, such as a stem, to move the valve between the open and closed positions. Some valves, such as gate valves, have an aperture that aligns with a passage of the valve to allow flow through the valve. The valve can be normally open, and the valve is closed when it is moved linearly to push the aperture out of alignment with the passage. Alternatively, a valve can be normally closed, and the valve is opened when it is moved linearly to position the aperture into alignment with the passage. Regardless of whether the valve is normally open or normally closed, the valve can be actuated, or moved between the open and closed position, by a valve actuator.

The return to normal mechanism of some valve actuators is a spring located around the same axis as the axis of the linearly translating member or located along an axis parallel to the linearly translating member. Such valve actuators can have an overall axial length that is dependent on the length of a linearly moving spring assembly, which is selected based on the amount of force required to return the valve to its normal position. The length of the spring assembly can also depend on the length of travel of the linearly translating member required to move the valve between the open and closed positions.

SUMMARY OF THE DISCLOSURE

The methods and systems of the current disclosure provide an actuator with an overall height that is independent from the length of the return spring assembly and has an improved range of application and customization compared to some current actuators. In embodiments described herein, a motion translator translates torque of torsional springs into linear movement of the stem. The use of a torsional spring assembly removes the spring's dependence on linear movement, and decouples the spring length from the actuator height. Because torsional springs store energy rotationally instead of linearly, the spring axis and stem axis are offset and the length of the stem is independent of the length of the spring. In addition, when transforming angular movement to linear movement there can be a geometric multiplier which results in a larger stroke range for a torsional spring relative to a coil spring. The increase in the stroke range gives flexibility in setting the initial spring deflection, which allows the actuator to be able to economically match the applications for which it is being designed.

In an embodiment of the current disclosure, an apparatus for actuating a valve includes an actuator body with a central body axis, and a proximal end and a distal end, the proximal end having a connector selectively connectable to a valve assembly. An actuator stem extends along the central body axis. A torsional spring assembly has at least one torsional spring with a spring axis that is offset at an angle from the central body axis. A motion translator engages an inner end of the torsional spring assembly and the actuator stem, selectively converting rotation of the at least one torsional spring about the spring axis of the torsional spring to linear movement of the actuator stem along the central body axis.

In an alternate embodiment of this disclosure, an apparatus for actuating a valve includes an actuator body with a central body axis and a proximal end and a distal end, the proximal end having a connector selectively connectable to a valve assembly. An actuator stem extends along the central body axis and is selectively connectable to a valve stem. A torsional spring assembly has at least one torsional spring with a spring axis that is offset at an angle from the central body axis, the at least one torsional spring of the torsional spring assembly having an outer end fixed to the actuator body and an inner end that is rotatable around the spring axis. A motion translator engages an inner end of the torsional spring assembly and the actuator stem. An actuating device is secured to a distal end of the actuator body, the actuating device engaging the actuator stem and selectively moving the actuator stem along the central body axis, rotating the at least one torsional spring about the spring axis with the motion translator.

In yet another alternate embodiment of this disclosure, a method for actuating a valve includes attaching a proximal end of an actuator body to a valve assembly. The actuator body has a central body axis, a distal end opposite the proximal end, and an actuator stem extending along the central body axis. A torsional spring assembly is installed within the actuator body, the torsional spring assembly having at least one torsional spring with a spring axis that is offset at an angle from the central body axis. Linear movement of the actuator stem along the central body axis is converted to rotation of the at least one torsional spring about the spring axis of the torsional spring with a motion translator, the motion translator engaging the actuator stem and engaging an inner end of the torsional spring assembly.

BRIEF DESCRIPTION OF THE DRAWINGS

Some of the features and benefits of the present disclosure having been stated, others will become apparent as the description proceeds when taken in conjunction with the accompanying drawings, in which.

DETAILED DESCRIPTION OF THE DISCLOSURE

The methods and systems of the present disclosure will now be described more fully hereinafter with reference to the accompanying drawings in which embodiments are shown. The methods and systems of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
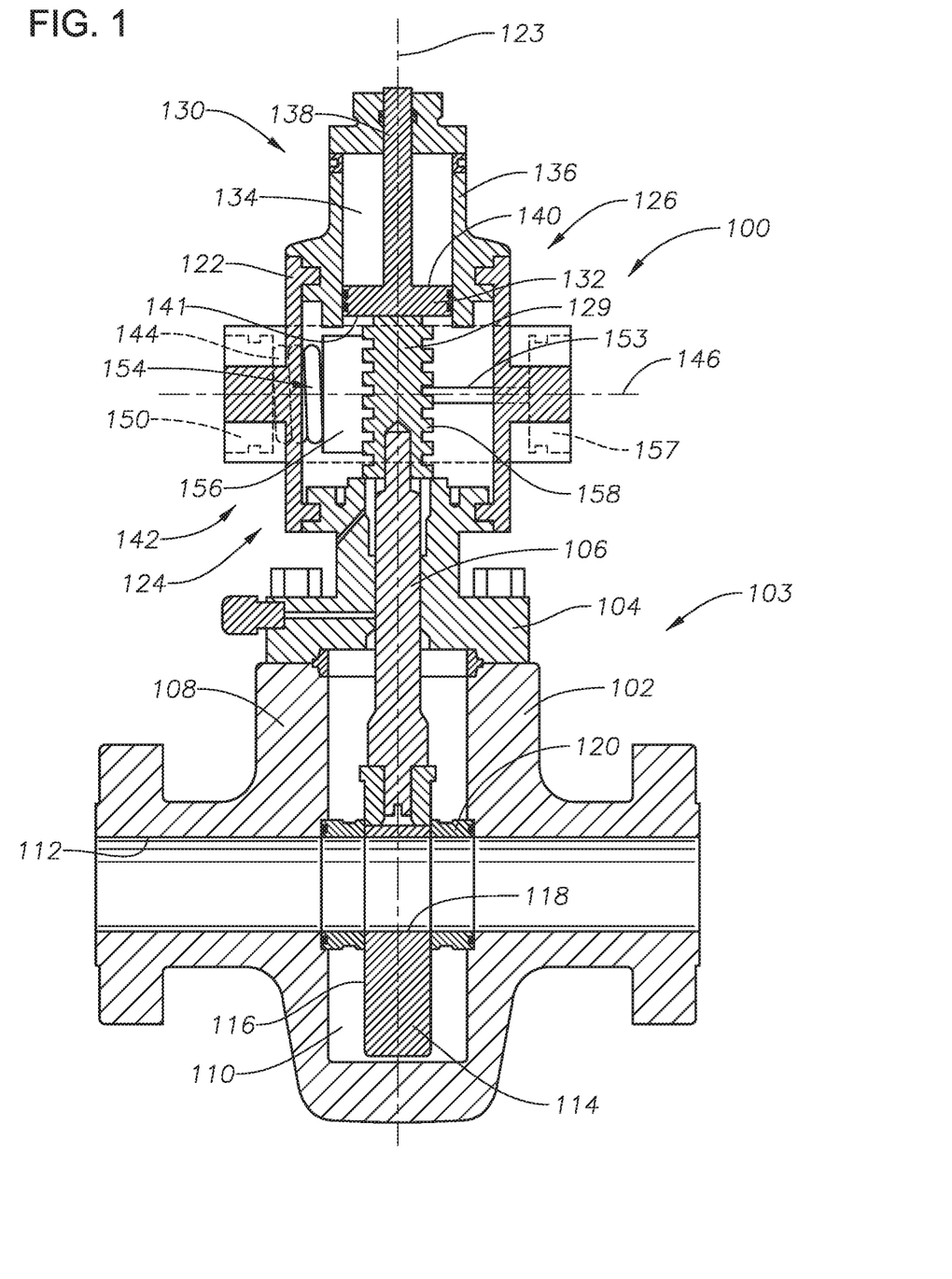
FIG. 1 is a section view of a valve with an actuator in accordance with an embodiment of this disclosure, shown with the valve stem in the contracted position.

Referring to FIG. 1, actuator 100 is shown attached to valve 102. Actuator 100 is used to open or close valve 102. Valve 102 is part of a valve assembly 103 that includes valve 102 and bonnet 104. Valve 102 can be located subsea, on an offshore platform, or on land. Valve 102 can be, for example associated with a wellhead assembly that is disposed over a well (not shown). The wellhead assembly can include a wellhead housing, a production tree over the housing and flow lines connected to the tree or the wellhead assembly. The flow lines and wellhead assembly can include embodiments of valve 102 described herein. Valve 102 can also be used for regulating fluids that communicate with the wellhead assembly, or for regulating well and other fluids that are otherwise travelling along a pipeline.

Bonnet 104 is connected to the body of valve 102. Valve stem 106 passes through bonnet 104. Actuator 100 is used to actuate valve 102 by urging valve stem 106 toward valve 102 so that valve stem 106 is in a retracted position. In the embodiment of FIG. 1, moving valve stem 106 towards valve 102 will cause valve 102 to open. In alternate embodiments, moving valve stem 106 towards valve 102 to the retracted position will cause valve 102 to close.

Valve 102 is shown, as an example, as a gate valve with a valve body 108 housing a chamber 110 therein. A passage 112 formed through the valve body 108 intersects the chamber 110. A gate 114 is shown within the chamber 110. Gate 114 is a generally planar member having a solid portion 116 and an opening 118 formed through the solid portion 116. Gate 114 is selectively slidable within the chamber 110. Annular valve seats 120 are shown co-axially located in the passage 112, each having an end extending into the chamber 110. In the embodiment of the valve 102 shown in FIG. 1, the opening 118 is aligned with the passage 112 so that valve 102 is in an open position. In the illustrated embodiment, valve 102 is shown as a gate valve as an example. However, valve 102 can be any other type of valve that is actuated by the linear extension or translation of a linear member.

Figure 3:
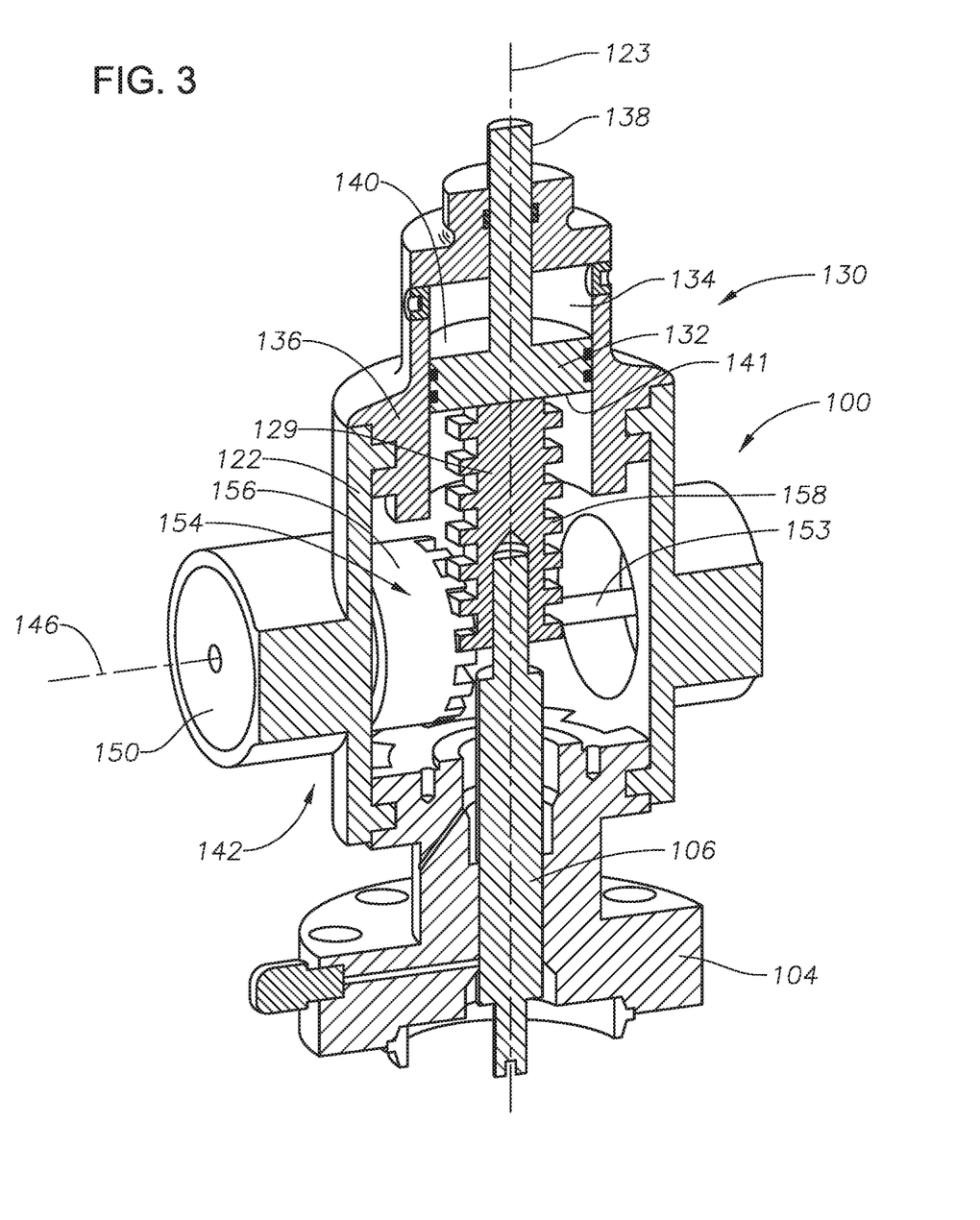
FIG. 3 is a section view of an actuator in accordance with an embodiment of this disclosure, shown with the valve stem in the extended position.

Looking at FIGS. 1 and 3, actuator 100 of an embodiment of this disclosure includes actuator body 122. Actuator body 122 can have a generally cylindrical body member having a central body axis 123. Actuator body 122 can have a proximal end 124 and a distal end 126. Proximal end 124 can be selectively connected to bonnet 104 of valve assembly 103. A connector, such as bolts (FIG. 1), retaining rings (not shown), threads (not shown), or other known means can be used to releasably secure actuator body 122 to bonnet 104 of valve assembly 103. Actuator stem 129 extends along central body axis 123 within actuator body 122. Actuator stem 129 is selectively connected to valve stem 106 so that as actuator stem 129 moves along central body axis 123, valve stem 106 moves with actuator stem 129.

Actuating device 130 can be releasably secured to the proximal end 124 of actuator body 122. Actuating device 130 can be, for example, a piston assembly as shown in FIGS. 1 and 3. In alternate embodiments, actuating device can be other known linearly acting actuating members. In the example embodiment of FIGS. 1 and 3, actuating device 130 includes piston member 132 located within piston cavity 134 of hydraulic head 136. Hydraulic head 136 is can be a generally cylindrical shaped member that has a sidewall that defines piston cavity 134 within hydraulic head 136. Piston member 132 can have an outer diameter with seals that engage an inner diameter of piston cavity 134. Piston member 132 can have piston stem 138 that extends through an opening in an end of hydraulic head 136. In alternate embodiments there may be no piston stem.

Piston member 132 can be moveable by a pressure media injected into piston cavity 134. A pressure media, such as pressurized hydraulic fluid, pressurized gas, or other known media is supplied to piston cavity 134 to apply a force to pressure surface 140 of piston member 132 and move piston member 132 in a first direction towards valve assembly 103. Piston member 132 has piston face 141 that is opposite pressure surface 140. Piston face 141 engages actuator stem 129 so that as pressure media is injected into piston cavity 134 and piston member 132 moves along central body axis 123 towards valve assembly 103, actuator stem 129 also moves towards valve assembly 103, causing valve stem 106 to move in the same direction to the retracted position and actuate valve 102 (FIG. 1).

Torsional spring assembly 142 is located within actuator body 122. Actuator body 122 includes portions that extend away from the generally cylindrical part of actuator body 122 in order to house torsional spring assembly 142. Torsional spring assembly 142 acts as a biasing member to urge or bias piston member 132 along central body axis 123 in a second direction away from valve assembly 103. In the example of FIGS. 1 and 3, torsional spring assembly 142 urges valve 102 towards the closed position with solid portion 116 of gate 114 blocking passage 112. Torsional spring assembly 142 has at least one torsional spring 144. In the example embodiment of FIG. 4A, torsional spring assembly 142 has one torsional spring 144. In the example embodiments of FIG. 4B-4C, torsional spring assembly 142 has two torsional springs 144. In the example embodiment of FIG. 4D, torsional spring assembly 142 has four torsional springs 144. In alternate embodiments, torsional spring assembly 142 can have three torsional springs 144, or can have more than four torsional springs 144. In other alternate embodiments, the first and second directions can be reversed so that the first direction is away from the valve assembly and the second direction is towards the valve assembly.

Each of the torsional springs 144 has a spring axis 146. Each spring axis 146 is offset at an angle from central body axis 123. In the example embodiments shown, each spring axis 146 is parallel to each other spring axis 146 and is generally perpendicular to central body axis 123. In alternate embodiments, each spring axis 146 can be oriented at an angle other than ninety degrees offset from central body axis 123. Torsional spring 144 of torsional spring assembly 142 has outer end 148 that is fixed to actuator body 122. Spring endcap 150 is secured to outer end 148 and spring endcap 150 is fixed to actuator body 122 so that outer end 148 of torsional spring 144 does not move relative to actuator body 122. Torsional spring 144 of torsional spring assembly 142 has inner end 152 that is rotatable around the spring axis 146. Stability bar 153 extends along spring axis 146 and assists in stabilizing torsional spring assembly 142 about spring axis 146.

Looking at FIGS. 1 and 3, motion translator 154 engages inner end 152 of torsional spring assembly 142 and engages actuator stem 129. Motion translator 154 can selectively convert rotation of the at least one torsional spring 144 about spring axis 146 of the torsional spring 144 to linear movement of actuator stem 129 along central body axis 123. Motion translator 154 can also selectively convert linear movement of actuator stem 129 along central body axis 123 to rotation of the at least one torsional spring 144 about spring axis 146 of the torsional spring 144.

As an example, moving actuator stem 129 in a first direction along central body axis 123 can cause the rotation of the at least one torsional spring 144 about the spring axis 146 by way of the motion translator 154. Moving actuator stem 129 in a first direction along central body axis 123 can store a potential energy in torsional spring assembly 142 by rotating the at least one torsional spring 144 about spring axis 146, either causing the torsional spring 144 to wind or unwind about spring axis 146 of the torsional spring 144. This potential energy loads torsional spring assembly 142 to urge actuator stem 129 towards a second direction along central body axis 123 so that if pressure media is released from piston cavity 134, torsional spring assembly 142 can cause actuator stem 129 to move in a second direction. This will cause valve stem 106 to move to an extended position (FIG. 3) and valve 102 can be returned to the normal position.

In the embodiments of FIGS. 1 and 3, motion translator 154 includes pinion member 156 and rack member 158. Pinion member 156 is secured to inner end 152 of torsional spring 144. Rack member 158 can be an integral part of actuator stem 129 or can be a separate member that is secured to, or otherwise engages, actuator stem 129. Pinion member 156 and rack member 158 have interlocking teeth that allow for the conversion between rotational movement of torsional spring 144 and linear movement of actuator stem 129. The interlocking teeth of pinion member 156 and rack member 158 can be designed so that when the interlocking teeth of pinion member 156 and rack member 158 engage to transform rotational movement to linear movement, a geometric multiplier can provide a large linear motion resulting from a relatively small rotational movement.

Figure 4A:
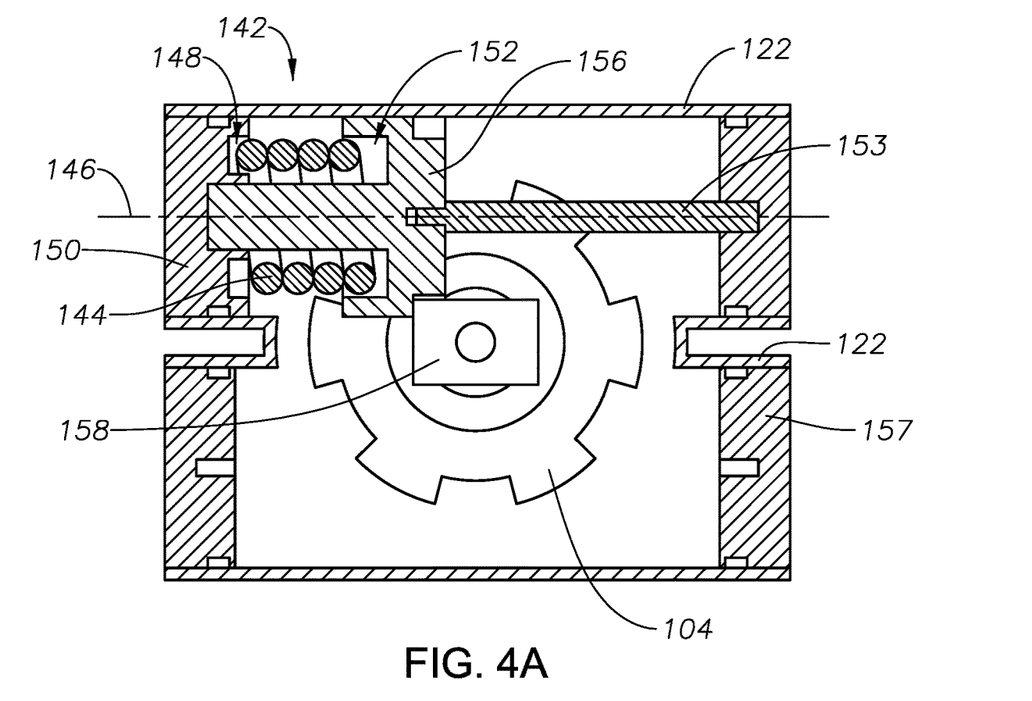
FIGS. 4A-4D are cross section views of an actuator in accordance with embodiments of this disclosure.
Figure 4B:
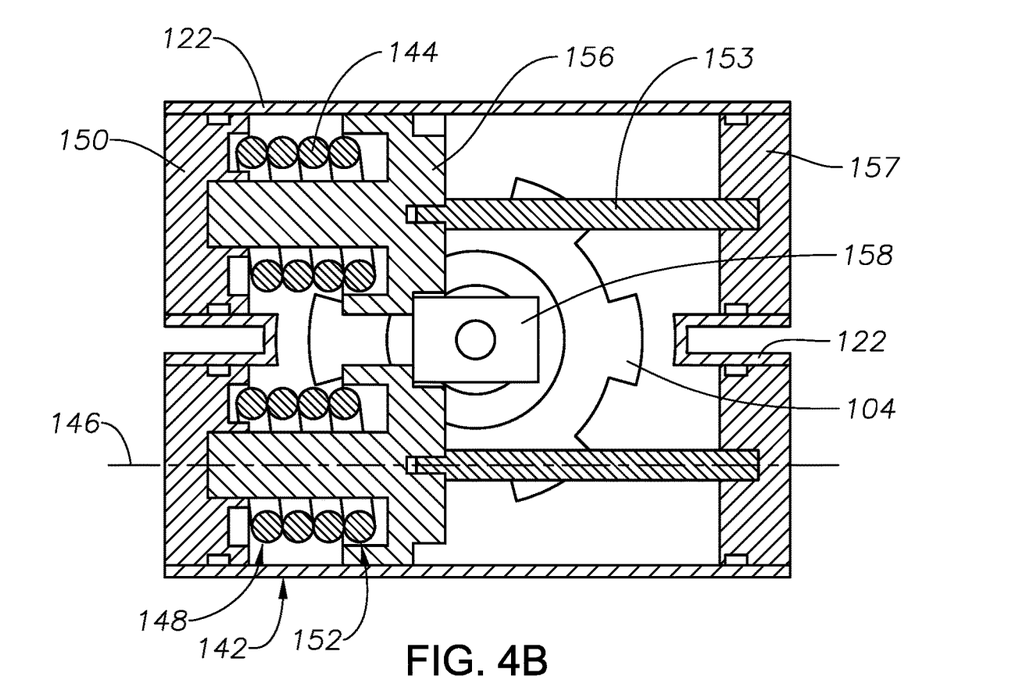
Figure 4C:
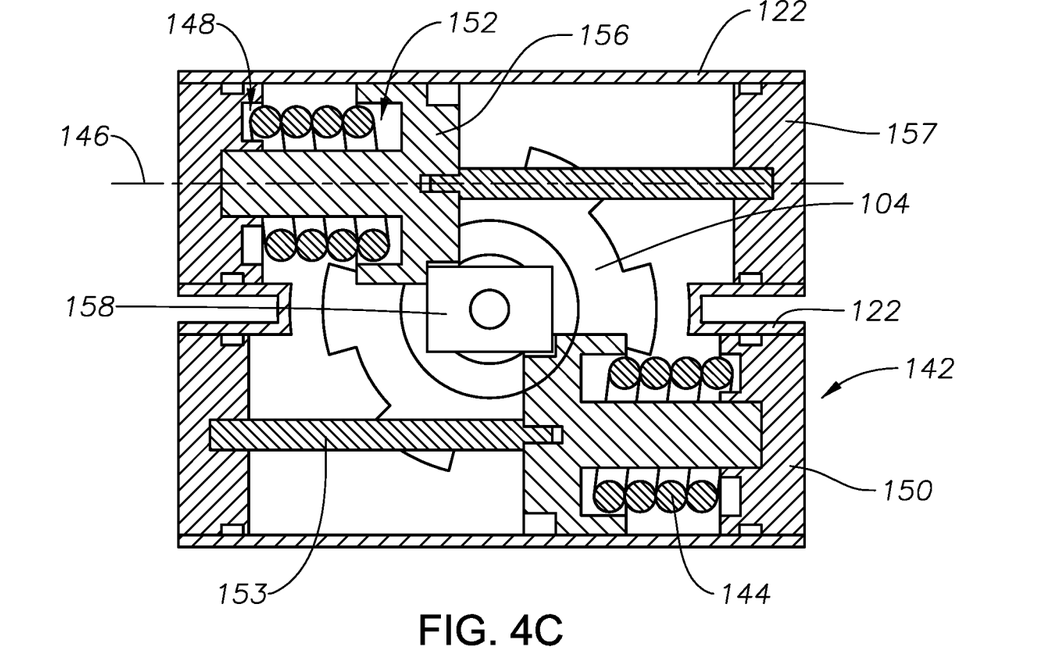
Figure 4D:
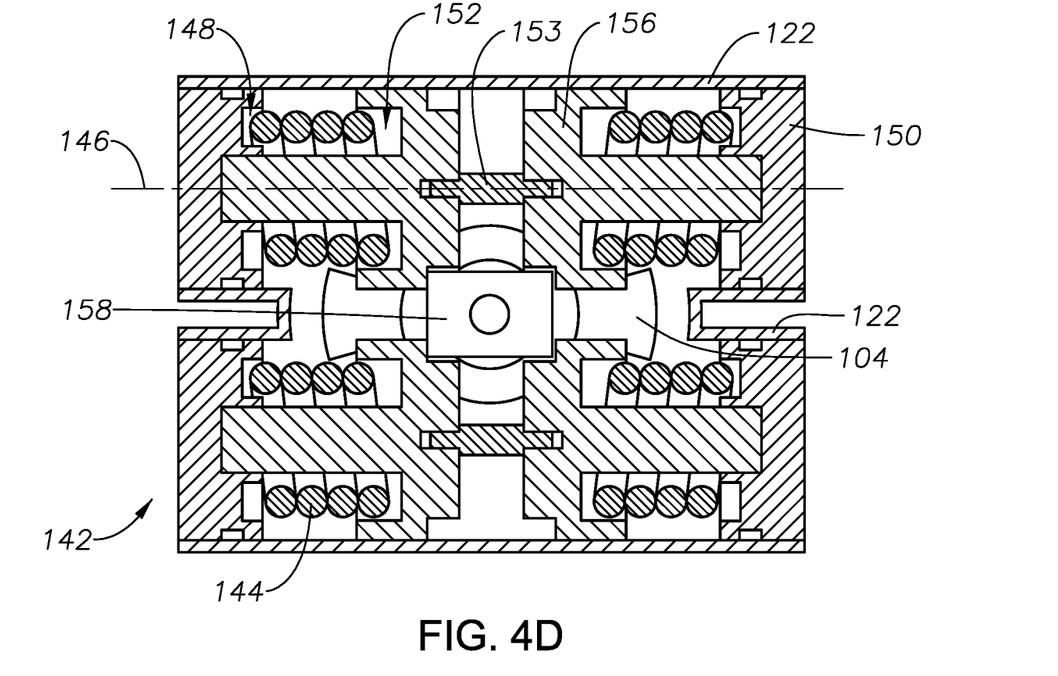

Stability bar 153 can engage a first pinion member 156 and extend across a diameter of actuator body 122. Where there is a second pinion member 156 positioned across from the first pinion member 156, the stability bar 153 will engage the second pinion member to maintain alignment between the first and second pinion members 156 (FIG. 4D). Where there is no pinion member 156 opposite the first pinion member, wear bushing cap 157 can be secured in an opposite side of actuator body 122. Stability bar 153 can in such an embodiment, as shown in FIGS. 4A-4C, engage wear bushing cap 157.

Figure 2:
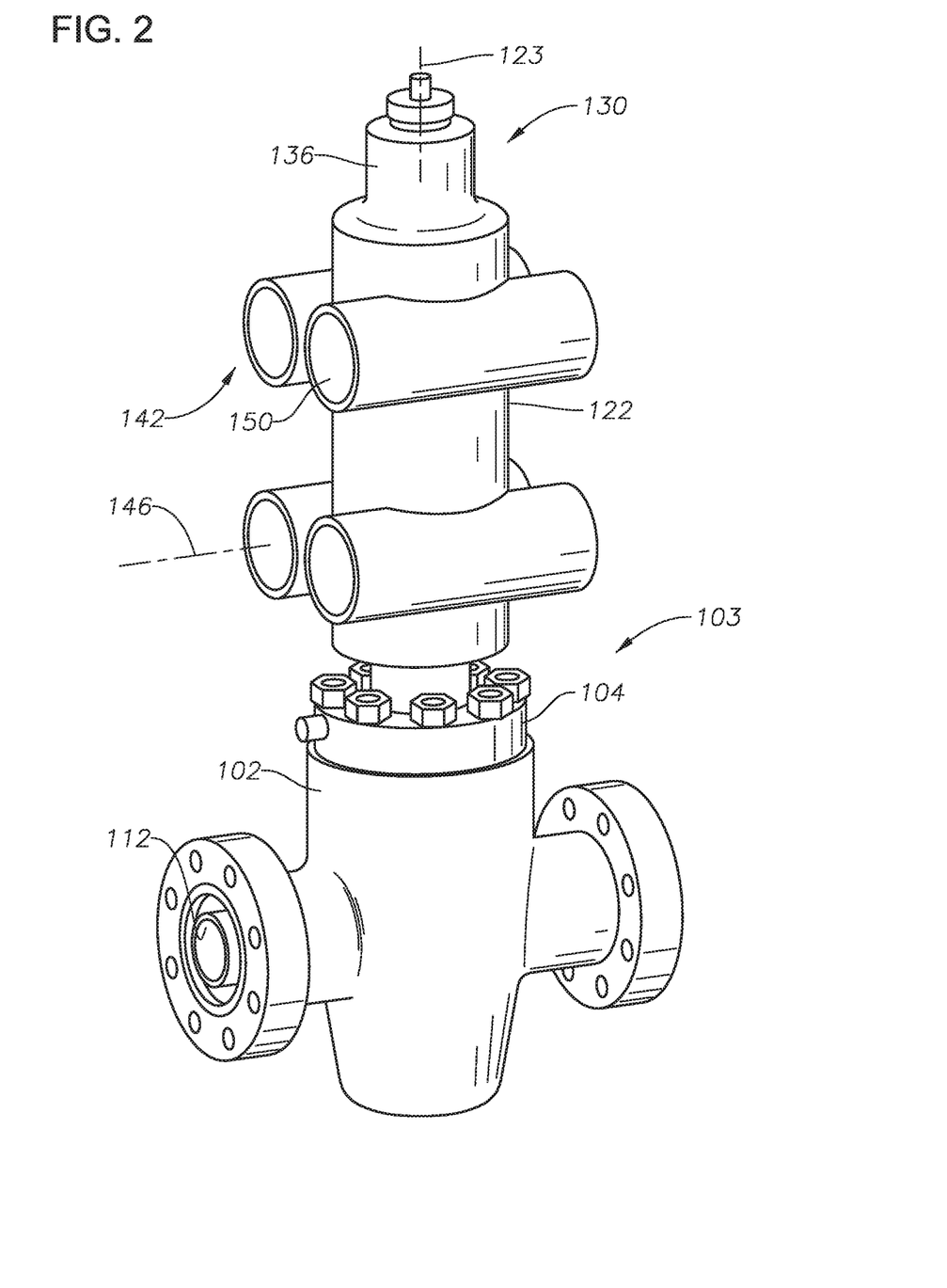
FIG. 2 is a perspective view of the valve with an alternate (stacked) actuator embodiment, in accordance with an embodiment of this disclosure.

The number of torsional springs 144 can be optimized In order to ensure that torsional spring assembly 142 has sufficient stored energy to return valve stem 106 to the extended position, while minimizing the force required by the pressure media to move valve stem 106 to the retracted position. Additional torsional springs 144 can be added along spring axis 146. Alternately, as shown in the example of FIG. 2, actuator body 122 can have a stacked spring structure with more than one axial level of torsional springs 144 (as measured along central body axis 123). In the example embodiment of FIG. 2, the stacked spring structure has two axial levels of torsional springs 144. The spring axis 146 of one of the levels of the torsional springs 144 are spaced axial apart along central body axis 123 relative to the spring axis 146 of the other levels of the torsional springs 144. In other alternate embodiments, there can be more than two axial levels of torsional springs 144.

In an example of operation, in order to assemble actuator 100 valve stem 106 and bonnet 104 can first be added to valve 102. Actuator stem 129 can be secured to valve stem 106 and piston member 132 can engage actuator stem 129. Proximal end 124 of actuator body 122 can then be releasably secured to bonnet 104. Torsional spring assemblies 142 can be located within actuator body 122, but spring endcap 150 is not yet fixed to actuator body 122. Stability bar 153 can be inserted to stabilize pinion members 156. Hydraulic head 136 can be attached to distal end 126 of actuator body and spring endcap 150 can be fixed to actuator body 122. When fixing spring endcap 150 to actuator body 122, a desired preload can be applied to torsional springs 144 to urge actuator stem 129 along the central body axis 123.

When an operator wishes to actuate valve 102, pressure media is injected into piston cavity 134 to apply sufficient force to pressure surface 140 to overcome the preload of torsional spring assembly 142 and move piston member 132 towards valve 102. As piston member 132 moves, piston face 141 engages actuator stem 129 and moves actuator stem 129 along central body axis 123. Actuator stem 129 in turn moves valve stem 106, actuating valve 102.

As actuator stem 129 moves linearly along central body axis 123, motion translator 154 converts the linear motion of actuator stem 129 to rotation of torsional spring 144 though the interaction of pinion member 156 and rack member 158. This stores energy in torsional spring assembly 142. In order to return valve 102 to a normal position, pressure media can be released from piston cavity 134 and the energy stored in torsional spring assembly 142 will urge actuator stem 129 in a direction away from valve 102. The speed and force with which torsional spring assembly 142 moves actuator stem 129 away from valve 102 will depend on the number of torsional springs 144 and the operational parameters of such torsional springs 144.

In order to increase the return force of torsional spring assembly 142, the number of torsional springs 144 and the properties of such torsional springs 144 can be adjusted without adding to the overall height of actuator 100. In addition, the stroke of actuator 100 can be increased by simply increasing the amount of winding in torsional spring 144 without torsional springs 144 affecting the overall height of actuator 100. The number of torsional springs 144 may be increased without being constrained to nesting, or lengthening the actuator design. The manufacture of actuator 100 can be standardized for multiple applications, with only the properties and number of torsional springs 144 being selected for a particular application. Therefore embodiments described herein provide the function of a traditional actuator but at a reduced size and with increased standardization in manufacturability.

The terms "vertical", "horizontal", "upward", "downward", "above", and "below" and similar spatial relation terminology are used herein only for convenience because elements of the current disclosure may be installed in various relative positions.

The system and method described herein, therefore, are well adapted to carry out the objects and attain the ends and advantages mentioned, as well as others inherent therein. While a presently preferred embodiment of the system and method has been given for purposes of disclosure, numerous changes exist in the details of procedures for accomplishing the desired results. These and other similar modifications will readily suggest themselves to those skilled in the art, and are intended to be encompassed within the spirit of the system and method disclosed herein and the scope of the appended claims.

What is claimed is:

1. A method for actuating a valve, the method comprising:
   attaching a proximal end of an actuator body to a valve assembly, the actuator body having a central body axis, a distal end opposite the proximal end, and an actuator stem extending along the central body axis;
   installing a torsional spring assembly within the actuator body, the torsional spring assembly having at least one torsional spring with a spring axis that is offset at an angle from the central body axis;
   linearly moving a linear actuator along the central body axis, the linear actuator engaging the actuator stem, to selectively move the actuator stem linearly along the central body axis; and
   converting linear movement of the actuator stem along the central body axis to rotation of the at least one torsional spring about the spring axis of the at least one torsional spring with a motion translator, the motion translator engaging the actuator stem and engaging an inner end of the at least one torsional spring, wherein the torsional spring exerts a radial energizing force to the linear actuator; wherein the torsional spring assembly includes a stacked spring structure having two or more levels spaced axially apart along the central body axis.

2. The method of claim 1, wherein moving the actuator stem along the central body axis to move valve assembly between a closed and open position stores a potential energy in the torsional spring assembly by rotating the at least one torsional spring about the spring axis.

3. The method of claim 1, wherein an outer end of the at least one torsional spring is static relative to the actuator body, the method further including rotating the inner end of the at least one torsional spring about the spring axis.

4. The method of claim 1, wherein the linear actuator comprises a piston assembly, and the method further comprises releasably securing the piston assembly to the distal end of the actuator body and injecting a pressure media into a piston cavity of the piston assembly to move the actuator stem along the central body axis in a first direction.

5. The method of claim 1, further comprising loading the torsional spring assembly to urge the actuator stem towards a second direction along the central body axis.

6. The method of claim 1, wherein the motion translator includes a pinion member and rack member, the pinion member secured to the inner end of the at least one torsional spring and the actuator stem including the rack member.

7. An apparatus for actuating a valve, the apparatus comprising:
   an actuator body with a central body axis and a proximal end and a distal end, the proximal end having a connector selectively connectable to a valve assembly;
   an actuator stem extending along the central body axis;
   a torsional spring assembly, the torsional spring assembly having at least one torsional spring with a spring axis that is offset at an angle from the central body axis;
   a linear actuator, the linear actuator secured to the distal end of the actuator body, the linear actuator engaging the actuator stem and selectively moving linearly along the central body axis to move the actuator stem along the central body axis; and
   a motion translator engaging an inner end of the torsional spring assembly and the actuator stem, selectively converting linear movement of the actuator stem along the central body axis to rotation of the at least one torsional spring about the spring axis of the at least one torsional spring, wherein the torsional spring exerts a radial energizing force to the linear actuator;
   wherein the torsional spring assembly includes a stacked spring structure having two or more levels spaced axially apart long the central body axis.

8. The apparatus of claim 7, wherein an outer end of the at least one torsional spring is static relative to the actuator body.

9. The apparatus of claim 7, wherein the linear actuator comprises a piston assembly releasably secured to the distal end of the actuator body, a piston member of the piston assembly moveable by a pressure media injected into a piston cavity of the piston assembly.

10. The apparatus of claim 7, wherein the linear actuator comprises a piston assembly in engagement with the actuator stem, the piston assembly operable to move the actuator stem in a first direction along the central body axis and wind the at least one torsional spring about the spring axis of the at least one torsional spring.

11. The apparatus of claim 7, wherein the torsional spring assembly is loaded to urge the actuator stem towards a second direction along the central body axis.

12. The apparatus of claim 7, wherein the motion translator includes a pinion member and rack member, the pinion member secured to the inner end of the at least one torsional spring and the actuator stem including the rack member.

13. The apparatus of claim 7, wherein the spring axis is generally perpendicular to the central body axis.

14. The apparatus of claim 7, further comprising a stability bar in communication with the torsional spring assembly to maintain alignment with the motion translator.

15. The apparatus of claim 7, wherein the torsional spring assembly is physically decoupled from the linear actuator and only mechanically connected to the linear actuator through the motion translator.

16. An apparatus for actuating a valve, the apparatus comprising:
   an actuator body with a central body axis and a proximal end and a distal end, the proximal end having a connector selectively connectable to a valve assembly;
   an actuator stem extending along the central body axis and selectively connectable to a valve stem;
   a torsional spring assembly, the torsional spring assembly having at least one torsional spring with a spring axis that is offset at an angle from the central body axis, the at least one torsional spring of the torsional spring assembly having an outer end fixed to the actuator body and an inner end that is rotatable around the spring axis;
   a motion translator engaging the inner end of the torsional spring assembly and the actuator stem;
   a linear actuator, the linear actuator secured to the distal end of the actuator body, the linear actuator engaging the actuator stem and selectively moving linearly along the central body axis to move the actuator stem along the central body axis, rotating the at least one torsional spring about the spring axis with the motion translator, wherein the torsional spring exerts a radial energizing force to the linear actuator; and a second torsional spring assembly, the inner end of which engaging the motion translator, the second torsional spring assembly having at least one second torsional spring with a spring axis, wherein the spring axis of the at least one torsional spring is parallel to the spring axis of the at least one second torsional spring.

17. The apparatus of claim 16, wherein the linear actuator comprises a piston assembly with a piston member moveable by a pressure media injected into a piston cavity of the piston assembly.

18. The apparatus of claim 16, wherein the valve stem has an extended position and a retracted position, the linear actuator operable to move the valve stem in a first direction towards the retracted position and the torsional spring assembly operable to move the valve stem in a second direction towards the extended position.

19. The apparatus of claim 16, wherein the motion translator includes a pinion member and rack member, the pinion member secured to the inner end of the at least one torsional spring and the actuator stem including the rack member.

20. An apparatus for actuating a valve, the apparatus comprising:
   an actuator body with a central body axis and a proximal end and a distal end, the proximal end having a connector selectively connectable to a valve assembly;
   an actuator stem extending along the central body axis;
   a torsional spring assembly, the torsional spring assembly having at least one torsional spring with a spring axis that is offset at an angle from the central body axis;
   wherein the torsional spring assembly includes a stacked spring structure having two or more levels spaced axially apart along the central body axis; and
   a motion translator engaging an inner end of the torsional spring assembly and the actuator stem, selectively converting rotation of the at least one torsional spring about the spring axis of the at least one torsional spring to linear movement of the actuator stem along the central body axis.

* * * * *